United States Patent [19]
Zipser

[11] 3,815,854
[45] June 11, 1974

[54] TREE STAND

[76] Inventor: Albert E. Zipser, 2007 Faith Home Rd., Modesto, Calif. 95351

[22] Filed: Mar. 12, 1973

[21] Appl. No.: 340,314

[52] U.S. Cl. .............................................. 248/47
[51] Int. Cl. ........................................... A47g 33/12
[58] Field of Search ....................................... 248/47

[56] References Cited
UNITED STATES PATENTS

| | | | |
|---|---|---|---|
| 1,721,980 | 7/1929 | Wardell | 248/47 |
| 1,848,556 | 3/1932 | Berman | 248/47 |
| 2,761,641 | 9/1956 | Tabbers | 248/47 |
| 3,350,043 | 10/1967 | Apple | 248/48 |

*Primary Examiner*—William H. Schultz
*Attorney, Agent, or Firm*—Flehr, Hohbach, Test, Albritton & Herbert

[57] ABSTRACT

A stand for holding trees upright, the stand including a base plate with scissor action legs arranged to facilitate rapid mounting and dismounting of the tree on the stand. A triangular base plate is provided with a sharpened point adapted to be impaled on the base of the tree trunk, and a bowl is mounted concentrically about the point to hold a reservoir of water. The legs are pivotally mounted to brackets extending upwardly from each apex of the triangular base plate. The leg lower portions are provided with stabilizing feet which contact the underlying floor surface, and the leg upper portions are provided with rounded ends having concaval recesses conforming with the outer surface of the tree trunk. Reaction forces acting on the leg lower portions from the weight of the tree pivot the leg upper portions inwardly into secure engagement with the trunk, with the legs then locked in position by the tightening of self-locking nuts.

1 Claim, 2 Drawing Figures 3,815,854

TREE STAND

BACKGROUND OF THE INVENTION

This invention relates to stands for supporting trees, e.g., Christmas trees, on a floor surface.

Various types of tree stands or holders have been suggested in the prior art. Among the prior art designs are the Christmas tree stands which commonly provide a number of ground engaging legs together with fasteners such as screws, nails or ring clamps adapted to engage with the tree trunk. Tree stands of this nature, however, present a number of shortcomings and undesirable features. For example, the mounting and dismounting operations of these prior art stands are time consuming and relatively difficult, especially where the tree is of considerable weight and bulk. Oftentimes the fastening means such as the screws or nails become misplaced or work loose from the trunk of the tree. In addition, these prior art tree stands are relatively complicated and expensive in design and construction. Accordingly, the need has been recognized for a new and improved tree stand which obviates the foregoing problems and shortcomings.

OBJECTS AND SUMMARY OF THE INVENTION

It is an object of the invention to provide a new and improved tree stand which is relatively simple and inexpensive in design and construction and incorporates a relatively few number of parts.

Another object is to provide a tree stand of the character described which facilitates rapid mounting and dismounting of the tree onto the stand without the requirement of using separate trunk-engaging fastener means such as screws or nails.

Another object is to provide a tree stand of the character described which incorporates scissor-action pivotal legs having upwardly extending ends adapted to securely engage the tree trunk with forces proportional to the combined weight of the tree and stand.

Another object is to provide a tree stand of the character described which is adapted to be secured to the lower base end of the tree trunk in a manner which establishes a relatively low position for the tree's center of gravity for purposes of increased stability.

The foregoing and additional objects and features of the invention are provided by means of a tree stand comprising a base plate having a centrally positioned, sharpened point for impaling with the lower base of the tree trunk. A plurality of elongate scissor-action legs are positioned at equally spaced-apart positions about the periphery of the base and are pivotally mounted thereto so that the leg lower portions extend into contact with the underlying floor surface and the leg upper portions are adapted to engage the outer surface of the trunk at an acute angle with respect to the trunk's longitudinal axis. Reaction forces acting upon the leg lower portions from the weight of the tree cause the legs to pivot so that the upper portions are forced into tight gripping engagement with the trunk.

BRIEF DESCRIPTIONS OF THE DRAWINGS

DESCRIPTION OF THE PREFERRED EMBODIMENTS

Figure 1:
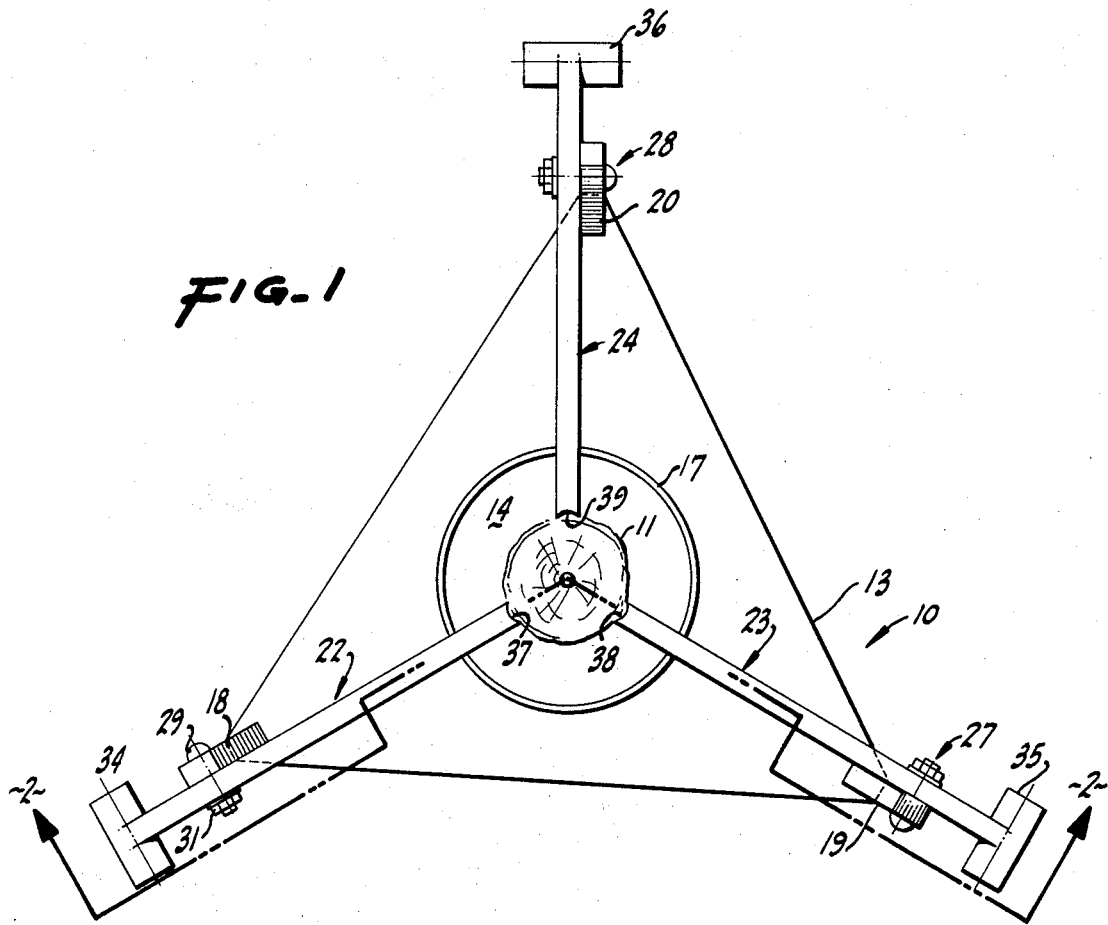
FIG. 1 is a top plan view of a tree stand incorporating the invention.
Figure 2:
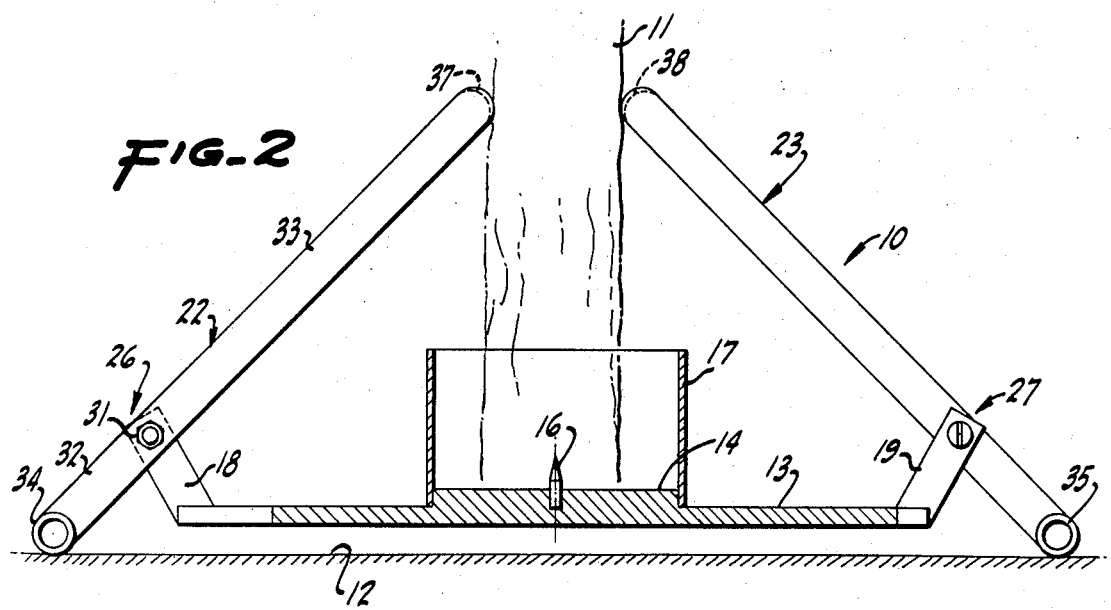
FIG. 2 is a vertical cross-sectional view taken along the line 2—2 of FIG. 1.

Referring to the drawings there is illustrated generally at 10 a stand for supporting a tree 11, such as a Christmas tree or the like, in upright position upon a floor surface 12. The stand includes a base plate 13 formed with a generally equilateral triangle configuration in plan view. The base plate is fabricated from a suitable material such as a high-strength synthetic plastic material to obviate the effects of corrosion. A circular boss 14 is formed on the upper surface of the base to abut the lower sawed-off base of the tree trunk. Impaling means is provided to center plate 13 on the trunk and comprises a centering pin or sharpened point 16 embedded in the plate at a centrally located position and extending upwardly along the longitudinal axis of the trunk. An upwardly open bowl is provided to contain a reservoir of water for the tree. The bowl is defined by a cylindrical wall 17 mounted about the periphery of base 14 and radially spaced from the outer surface of the trunk to define an annular volume for containing water.

At each of the three base plate apexes there is provided an upwardly and outwardly inclined bracket 18, 19, 20, preferably formed integrally with the base plate. At each apex there is also provided an elongate scissor-action leg 22, 23, 24 pivotally mounted intermediate its ends to a respective bracket by pivot means 26, 27 28. The pivot means 26 for leg 22 is typical and comprises a bolt 29 projecting through aligned openings formed in the leg and bracket 18, together with releaseable fastener means, which preferably comprises the self-locking nut 31. This nut is threadably secured to the bolt and is adapted to be adjustably tightened for securely locking a respective leg in operating position, or to release the same to facilitate mounting or dismounting of the tree. The location of the pivotal connection along the length of the legs is predetermined to divide the same into a lower portion 32 sized to extend vertically below the base plate, and an upper portion 33 sized to extend upwardly at an acute angle with the longitudinal axis of the trunk into engagement with the trunk outer surface. The leg, bracket and base plate elements are sized and proportioned so that with the tree mounted to the stand there is minimal vertical clearance between the tree base plate and floor surface 12 and thus the tree's center of gravity is positioned relatively low. This achives improved stability while the tree is held in upright position.

The legs 22 through 24 are further provided with means forming stabilizing feet 34, 35, 36 each of which comprises a transversely disposed tubular member attached to the leg lower portions 32. The distal ends of the leg upper portions 33 are rounded in side view, and are formed with concaval recesses 37, 38, 39 (best seen in FIG. 1) adapted for conforming engagement with the outer circular surface of the trunk.

In operation, the sawed-off tree trunk is first prepared for mounting by driving a sharp object such as a nail into the center of the trunk base, and then the nail is removed to leave an opening for receiving centering pin 16. The stand 10 is next placed in upright position on floor 12 with the legs 22, 23 24 raised vertically. The tree is then lowered onto the holder with the centering pin being guided into the opening formed in the trunk base. Alternatively, the centering pin may be directly impaled into the trunk base by striking the lower side of the base plate with a hammer or other tool. The three legs are pushed inwardly into contact with the trunk surface, and the full weight of the tree is then placed upon the stand and floor surface. The reaction forces from the weight of the tree and stand acting upwardly against the stabilizing feet and leg lower portions tends to pivot the arms in a scissors action about the respective pivot means 26, 27, 28 so that the leg rounded ends are forced into secure engagement with the trunk. The nuts 31 are then tightened to lock the legs in position. Water is then poured into the annulus between the trunk and bowl 17, as desired. For dismounting, the tree is raised to relieve the weight from the stand, the nuts 31 are loosened, the legs are manually disengaged from the trunk and pivoted outwardly, and the trunk is pulled from the centering pin.

From the foregoing, it is apparent that there has been provided a new and improved tree stand providing a number of advantages over existing designs. The stand is comprised of a relatively few number of inexpensive elements, and may be readily mounted upon and dismounted from a tree without the requirement of utilizing separate fastener means such as nails or screws. When mounted the tree is securely held in upright position by the scissor action legs whereby the forces engaging the legs with the tree trunk are proportional to the weight of the tree and stand. In addition, the mounted tree is relatively stable because of the low center of gravity it assumes while on the stand.

While the foregoing embodiment is at present considered to be preferred it will be understood that numerous variations and modifications may be made therein by those skilled in the art and it is intended to cover in the appended claims all such variations and modifications as fall within the true spirit and scope of the invention.

I claim:

1. In a stand for supporting the trunk of a tree on a floor surface, the combination of a planar base plate having an equilateral triangle configuration in plan view and being adapted to be positioned below said trunk at right angles to the longitudinal axis of said trunk, impaling means carried by said plate and projecting outwardly therefrom for impaling into the base of said trunk, three elongate legs each of which is positioned at a respective apex of said triangular base plate, means pivotally mounting the legs to said base whereby each leg includes a lower portion extending below said plate into contact with said surface and an upper portion extending above said plate toward the trunk at an acute angle with respect to said axis whereby reaction forces from the weight of the tree and stand act against said leg lower portions to pivot the leg upper portions into engagement with said trunk, the distal ends of said leg upper portions being formed with concaval recesses adapted for substantial conforming contact with the outer circular contour of said trunk, said pivotal mounting means including releasable fastener means adapted to selectively lock a respective leg in fixed relationship with the base plate for securely holding the leg upper portion in engagement with the tree trunk, the fastener means further being selectively released for pivoting of the leg upper portions out of engagement with the tree trunk, means forming stabilizing feet on the lower portions of each leg, said stabilizing feet projecting laterally on either side of respective legs, and means forming an upwardly open bowl on said base plate concentric with said impaling means and radially spaced about said trunk to define a water reservoir.

* * * * *